April 20, 1954 H. RINIA 2,676,246
SUPERREGENERATIVE RECEIVER FOR VERY SHORT WAVE
Filed Oct. 5, 1950
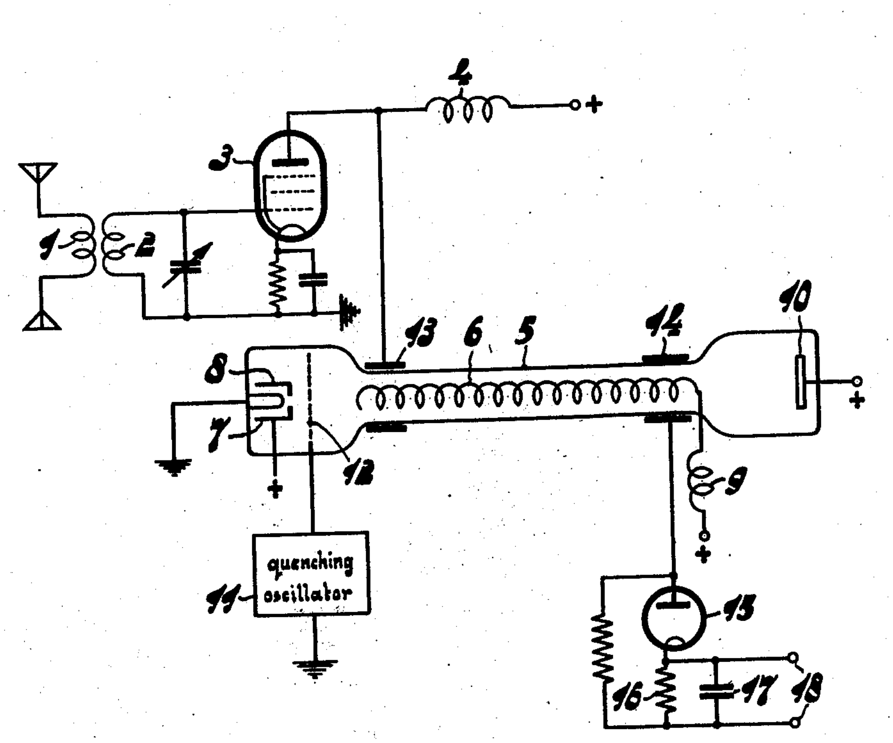
INVENTOR.
HERRE RINIA
BY Fred M Vogel
AGENT Patented Apr. 20, 1954 2,676,246

UNITED STATES PATENT OFFICE 2,676,246

SUPERREGENERATIVE RECEIVER FOR VERY SHORT WAVE

Herre Rinia, Eindhoven, Netherlands, assignor to Hartford National Bank and Trust Company, Hartford, Conn., as trustee Application October 5, 1950, Serial No. 188,527

Claims priority, application Netherlands October 10, 1949

6 Claims. (Cl. 250—20)

This invention relates to super-regenerative receivers for very short waves, for example super-regenerative receivers for the reception of television signals.

As is known, super-regenerative receivers comprise a tube connected in an oscillator circuit and controlled by the incoming oscillations. Under the action of a so-called quenching oscillation, the oscillations produced in the tube are periodically interrupted, so that oscillation periods alternate with periods during which no oscillations are produced in the tube. Super-regenerative receiving circuits are based on the fact that the amplitude of the oscillations produced increases during the oscillation periods and it will attain a definite value more rapidly as the strength of the incoming signal is greater.

If, as in the case of television receivers, a wide frequency range must be accommodated, it would be desirable to choose a very high quenching frequency, since, as can easily be shown, the width of the received frequency band is of the same order as the quenching frequency in view of the necessity of using a filter by which the quenching frequency is suppressed. However the high-frequency width of the oscillator circuit must be at least about ten times that of the latter. Then using the usual oscillator circuits a maximum limit is set, above which it is no longer possible, with the use of the normal oscillatory circuits, to permit the oscillations of a super-regenerative receiver to attain such a high value during the period of oscillation that a signal of sufficient strength occurs across the output circuit. The reason for this is that, as a rule, at a very high quenching frequency, the time available for the oscillations produced across the circuits of the tube operating as an oscillator to increase or to drop to the required values, is too short, even if additional measures are taken to increase the damping of these circuits during the quenching period. This applies both to circuits with lumped inductance and capacity and to so-called cavity resonators. In super-regenerative circuits, however, it is imperative that, at the end of the quenching period, the oscillations across the circuits of the oscillator tube should have decreased to a minimum value corresponding to the noise level, since only then the maximum amplitude of the oscillations attained during the period of oscillation is exclusively dependent on the strength of the incoming signal operative in the input circuit.

The invention provides an expedient by which the limit of the quenching frequency can be materially raised. It consists in that the oscillator, the operation of which is periodically interrupted with the quenching frequency, is of a particular type which comprises a discharge tube in which an electron beam is produced which traverses a preferably helical conductor wound in the form of a cylinder, this conductor being constructed such that the velocity of propagation of the electric waves produced therein, along the axis of the helical conductor is materially lower than that in the free space, and the voltages applied to the electrodes of the tube are such that the mean velocity of the electrons of the beam slightly exceeds the velocity of propagation of the waves along the axis. Oscillations may be produced across the conductor, if the end remote from the source of electrons is terminated in such manner that a certain reflection occurs. The natural oscillation of such an oscillator depends upon the size of the conductor and is consequently adjustable by a correct choice of this size. If, as is generally the case, the conductor is a helix arranged about or in the tube, the natural frequency of the helix is variable by varying the diameter, the pitch or the length of the helix. The interruption takes place, for example, by inserting in the tube a grid-shaped electrode across which the quenching oscillation is operative with an amplitude such that the beam is periodically suppressed.

It is to be noted that so-called travelling-wave amplifiers are known, which comprise a tube in which an electron beam is produced, which follows the axis of a helical conductor. The oscillations to be amplified are supplied to the helix and nearest to the source of electrons, the amplified oscillations being taken from the other end which is terminated across the impedance corresponding with the surge impedance of the helix. Thus travelling waves are produced across the helix, the amplitude of which increases approximately logarithmically from start to finish.

The advantage of the use of an oscillator of the aforesaid type primarily consists in that, at the beginning of an oscillation period, the amplitude of the oscillations produced may increase much more rapidly than with the use of the conventional oscillators with lumped inductance and capacity or cavity resonators, since the building-up time varies with the transit time of the electron of the beam and not with the mutual conductance and circuit capacity as is the case with a triode oscillator. With a sufficient damping, moreover, the oscillations produced across the helix will die out much more rapidly when the beam is suppressed. The result is that the quenching frequency used, may be materially higher than in the conventional super-regenerative receivers, hence the frequency band to be transmitted may also be wider. A further advantage is that the tube may carry a high electron-current strength, so that comparatively little noise occurs.

In order that the invention may be more clearly understood and readily carried into effect, it will now be described more fully with reference to the accompanying drawing, in which one embodiment thereof is shown by way of example.

Referring to the drawing, the reference numeral 1 designates an antenna circuit which is coupled to the input circuit of a high-frequency amplifying tube 3, the anode of which is connected through an inductance 4 to the positive terminal of a supply. The tube 3 comprises three grids and its primary purpose is to prevent the oscillations produced in the other part of the circuit-arrangement from being radiated from the antenna.

The modulated signal oscillations across the anode of tube 3 are supplied to an input electrode (shown in the form of a cylinder 13) of the tube 5 operating on the super-regenerative principle. This tube comprises a helically wound conductor 6 in an evacuated envelope. In the tube the cathode 7, together with the positive focussing electrode 8, produces an electron beam which is projected along the axis of the helix 6 and finally strikes the positive collecting electrode 10. In order to afford a sharply defined beam, the tube may be surrounded by a magnet coil in a conventional manner, or contain a very small quantity of rare gas. The helix may be connected, by way of an inductance 9, having a high impedance with respect to the high-frequency oscillations on the helix to a preferably low positive potential.

It has been found that, if the potential of the electrode 10 is chosen such that the velocity of the electrons of the beam slightly exceeds the velocity of propagation of electric waves along the helix and if, as is the case in the present embodiment, a certain reflection occurs at the helix end remote from the source of electrons, stationary waves are produced across the helix, the frequency of which vary with the dimensions of the helix, such as the pitch, the diameter of the turns, and so on. According to the invention this is utilized to advantage to amplify the oscillations of very high frequency, which occupy a wide frequency range, in accordance with the super-regenerative principle. According to the invention provision is made of means for interrupting the produced oscillations periodically. This may be effected by providing the tube with a grid-shaped electrode 12, which is arranged in the path of the beam and across which the quenching oscillation from the generator 11 is operative. Since the amplitude of the oscillations increases very rapidly and again decreases very rapidly to the initial value, a very high quenching frequency may be chosen.

The modulated pulses built up of a number of oscillations, may be taken from any desired point of the helix. In the present embodiment this is effected capacitatively by means of a cylindrical electrode 14 arranged to surround the tube. Detection takes place in the diode 15 and the modulation voltages are taken from the parallel combination of a resistance 16 and condenser 17.

It is obvious that the interruption of the oscillations may be effected in a different manner. Thus, for example, the grid 12 may be replaced by a different control system, for example a system comprising one or more deflecting electrodes. Furthermore, the oscillations need not be supplied and taken off capacitatively. This may, for example, be effected inductively or conductively.

What I claim is:

1. In a super-regenerative receiver for high-frequency waves, the combination comprising an oscillator including a travelling wave tube provided with a helical conductor and means to direct an electron beam along the axis of said conductor, means to apply an input wave to one end of said conductor, means reflectively terminating the other end of said conductor to sustain oscillations in said tube, and quenching means coupled to said tube periodically to interrupt the oscillations produced by said oscillator.

2. In a super-regenerative receiver for high-frequency waves, the combination comprising an oscillator including a travelling wave tube provided with a helical conductor, means to direct an electron beam along the axis of said conductor and a grid electrode disposed in the path of said beam, means to apply an input wave to one end of said conductor, means reflectively terminating the other end of said conductor to sustain oscillations in said tube, and means to apply a quenching voltage to said grid electrode to interrupt periodically the oscillations produced by said oscillator.

3. In a super-regenerative receiver for high-frequency waves, the combination comprising an oscillator including a travelling wave tube provided with a helical conductor, an electron source disposed adjacent one end of said conductor and a collector electrode disposed adjacent the other end of said conductor, said source projecting an electron beam along the axis of said conductor toward said collector electrode, means to apply an input wave to said one end of said conductor, means terminating the other end of said conductor to produce reflections whereby oscillations are sustained in said tube, and quenching means coupled to said tube periodically to interrupt the oscillations generated by said oscillator.

4. In a super-regenerative receiver for high-frequency waves, the combination comprising an oscillator including a travelling wave tube provided with a helical conductor, an electron source disposed adjacent one end of said conductor and a collector electrode disposed adjacent the other end of said conductor, said source projecting an electron beam along the axis of said conductor toward said collector electrode, means to apply an input wave to said one end of said conductor, said conductor having a construction in which the velocity of propagation of said wave along said axis is materially lower than in free space, means to apply a potential to said collector electrode at which the electrons in said beam having a mean velocity exceeding the velocity of propagation of the waves along the axis, means terminating the other end of said conductor to produce reflection whereby oscillations are sustained in said tube, and quenching means coupled to said tube periodically to interrupt the oscillations generated by said oscillator.

5. In a super-regenerative receiver for high-frequency waves, the combination comprising an oscillator including a travelling wave tube provided with a helical conductor, an electron gun disposed adjacent one end of said conductor, a collector electrode disposed adjacent the other end of said conductor and a grid electrode interposed between said electron gun and said one end of said conductor, said gun projecting an electron beam along the axis of said conductor toward said collector electrode, means to apply an input wave to said one end of said conductor, said conductor having a construction in which the velocity of propagation of said wave along said axis is materially lower than in free space, means to apply a potential to said collector electrode relative to said gun at which the electrons in said beam having a mean velocity exceeding the velocity of propagation of the waves along the axis, means terminating the other end of said conductor to produce reflections whereby oscillations are sustained in said tube, and means to apply a quenching voltage to said grid electrode to periodically interrupt the oscillations generated by said oscillator.

6. A receiver, as set forth in claim 5, further including a diode detector coupled to said other end of said helical conductor.

References Cited in the file of this patent

UNITED STATES PATENTS

| Number | Name | Date |
| --- | --- | --- |
| 1,915,076 | Tonks | June 20, 1933 |
| 2,064,469 | Haeff | Dec. 15, 1936 |
| 2,096,460 | Llewellyn | Oct. 19, 1937 |
| 2,190,511 | Cage | Feb. 13, 1940 |
| 2,190,515 | Hahn | Feb. 13, 1940 |
| 2,232,050 | Clavier et al. | Feb. 18, 1941 |
| 2,300,052 | Lindenblad | Oct. 27, 1942 |
| 2,379,673 | Banks | July 3, 1945 |
| 2,520,383 | Craig | Aug. 29, 1950 |
| 2,593,113 | Cutler | Apr. 15, 1952 |
| 2,603,772 | Field | July 15, 1952 |